(12) United States Patent
Fauteux et al.

(10) Patent No.: US 6,358,289 B1
(45) Date of Patent: Mar. 19, 2002

(54) CONDITIONING CARBONACEOUS MATERIALS THROUGH SLOW SCANNING CYCLING IN AN ELECTROCHEMICAL CELL

(75) Inventors: Denis G. Fauteux; Eric S. Kolb, both of Acton, MA (US)

(73) Assignee: Mitsubishi Chemical Corporation (JP)

( * ) Notice: Subject to any disclaimer, the term of this patent is extended or adjusted under 35 U.S.C. 154(b) by 0 days.

(21) Appl. No.: 09/366,497

(22) Filed: Aug. 3, 1999

(51) Int. Cl.[7] .............................................. H01M 10/42
(52) U.S. Cl. ...................... 29/623.1; 429/217
(58) Field of Search ........................ 29/623.1; 429/217

(56) References Cited

U.S. PATENT DOCUMENTS 5,580,686 A * 12/1996 Shi et al.
5,853,917 A * 12/1998 Fauteux et al.
5,856,045 A * 11/1999 Fauteux et al.

* cited by examiner

*Primary Examiner*—John S. Maples
(74) *Attorney, Agent, or Firm*—Factor & Partners

(57) ABSTRACT

A process for conditioning an electrochemical cell comprising the steps of fabricating an electrochemical cell comprising a first electrode which comprises a carbonaceous active material and a lithium polysilicate binder, a second electrode, and an electrolyte, and controllably cycling the electrochemical cell, and in turn, forming a passivation layer near the interface between the first electrode and the electrolyte.

7 Claims, 1 Drawing Sheet

CONDITIONING CARBONACEOUS MATERIALS THROUGH SLOW SCANNING CYCLING IN AN ELECTROCHEMICAL CELL

BACKGROUND OF THE INVENTION

1. Field of the Invention

The present invention relates in general to electrochemical cells, and more particularly, to a process for conditioning an electrochemical cell in the absence of an additive or an electrolyte co-solvent.

2. Background Art

Conventional electrochemical cells are conditioned, prior to normal use, by cycling (i.e. charging and discharging) the electrochemical cell several times in a controlled fashion. During conditioning of the of the electrochemical cell, a solid electrolyte interface (SEI) or passivation layer is formed. The formation of the passivation layer occurs when an electrolyte component, such as an additive or a co-solvent undergoes one or more chemical changes including reduction or decomposition. Once a stable passivation layer has been formed the electrochemical cell can be cycled, or put into normal operation, in a safe and reliable manner.

While the formation of a passivation layer serves a valuable purpose during operation of an electrochemical, the conventional processes used to form such a passivation layer are not without drawbacks. First, the cost of using conventional additives and/or co-solvents can be expensive, thereby increasing the overall cost of manufacturing the cell. Moreover, incorporating an additive or co-solvent into a conventional electrolyte can, over time, adversely affect the electrochemical performance of the cell. In particular, the additives and/or co-solvents tend to decompose and contaminate the electrolyte, thereby leading to inefficiencies in the cycling process of the electrochemical cell.

It is therefore an object of the present invention to provide a process for conditioning an electrochemical cell that remedies the aforementioned complications and/or detriments associated with conventional conditioning techniques.

SUMMARY OF THE INVENTION

The present invention is directed to a process for conditioning an electrochemical cell comprising the steps of: (a) fabricating an electrochemical cell comprising a first electrode which a comprises carbonaceous active material and a lithium polysilicate binder, a second electrode, and an electrolyte, and (b) controllably cycling the electrochemical cell, and in turn, forming a passivation layer near the interface between the first electrode and the electrolyte.

In a preferred embodiment of the process, the step of controllably cycling the electrochemical cell comprises the step of charging and discharging the cell at a rate ranging from approximately 0.01 mV/s to approximately 1 mV/s.

In another preferred embodiment of the process, the step of controllably cycling the electrochemical cell comprises the step of applying and removing an electrical potential difference ranging from between approximately 0 volts to approximately 3 volts.

It is also contemplated that the invention further comprise the step of increasing the coulombic efficiently of the electrochemical cell relative to an electrochemical cell cycled at faster cycling rates.

Preferably the step of fabricating the electrochemical cell includes the step formulating an electrolyte comprising a salt dissolved in propylene carbonate.

In addition, the step of fabricating the electrochemical cell may include the step of formulating a first electrode comprising graphite and lithium polysilicate binder, and a second electrode comprising a lithium source.

BRIEF DESCRIPTION OF THE DRAWINGS

The invention will now be described with reference to the drawings wherein.

DETAILED DESCRIPTION OF THE INVENTION

Figure 1:
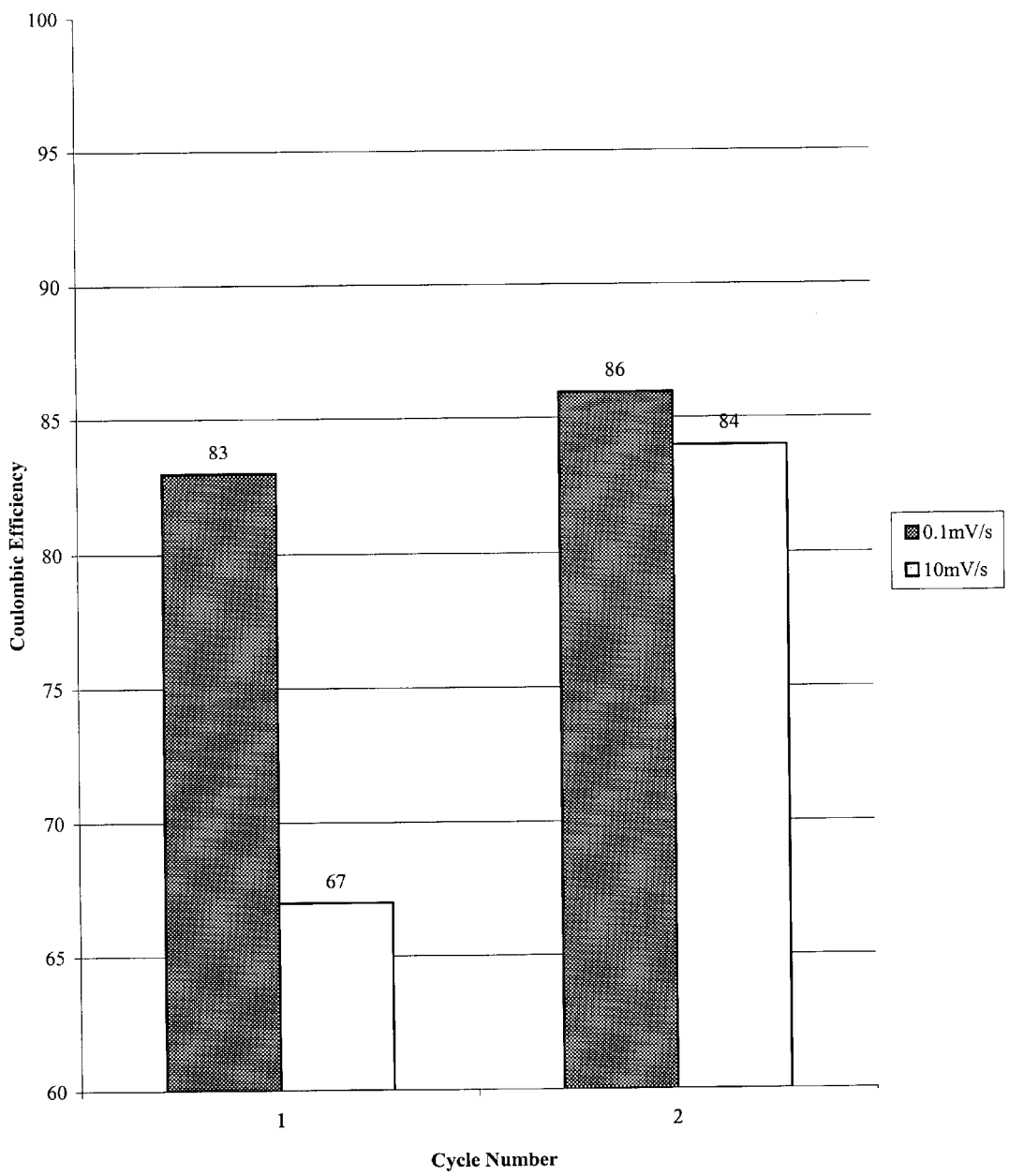
FIG. 1 of the drawings is a two-dimensional bar plot showing coulombic efficiency as a function of cycle number for electrochemical cells fabricated in accordance with the present invention.

While this invention is susceptible of embodiment in many different forms, there is shown in the drawings and described herein in detail several specific embodiments with the understanding that the present disclosure is to be considered as an exemplification of the principles of the invention and is not intended to limit the invention to the embodiments illustrated.

Conventional, prior art electrochemical cell conditioning processes associate an additive or electrolyte co-solvent with the cell and then cycle the cell between approximately 0 volts and 5 volts at a rate of about 10 millivolts per second (mV/s) As previously discussed, the problem with this type of process is that the use of additives and co-solvents can be quite expensive, and over time, can lead to inefficiencies in the cycling process.

The present invention, on the other hand, is directed to a process for conditioning an electrochemical cell in such a way so as to form a passivation layer without utilizing a passivating additive or electrolyte co-solvent, such as ethylene carbonate (EC). The process according to the present invention, eliminates the need for incorporation of these components into the cell. The process in accordance with the present invention comprises the following steps:

First, an electrochemical cell is fabricated using conventional techniques. It will be understood that the electrochemical cell may comprise a first electrode (an anode), a second electrode (a cathode), and an electrolyte. The first electrode preferably includes a carbonaceous active material, such as carbon black or graphite and a lithium polysilicate binder, which is applied to a copper current collector. The second electrode preferably comprises a lithium source. The electrolyte typically comprises a 1M solution of salt, such as $LiAsF_6$ or $LiBF_4$ dissolved in a solvent, such as propylene carbonate (PC).

After the electrochemical cell has been fabricated, it is cycled according to the following protocol: An electrical potential difference is applied to the cell. The electrical potential difference can vary depending upon the configuration of the cell, however, in the range of 0–3 volts is preferred. The charge rate of the cell is preferably quite low, such as approximately 0.01 mV/s to approximately 1 mV/s. Indeed, as will be discussed in greater detail below, it has been determined that when a carbonaceous/lithium polysilicate electrode is charged according to the above-identified protocol, the resulting cell exhibits coulombic efficiencies indicative of cells having formed, stabilized, passivating layers. It is believe that either the lithium polysilicate or the combination of lithium polysilicate and PC form a passivation layer near the surface of the electrode/electrolyte interface.

In addition, while it is preferred that an additive not be associated with the cell, it is completed that small amounts of an additive can be associated with the cell—if desired. For purposes of the present disclosure the additive may comprise 1,6-dioxaspiro[4.4]nonane-2-7 dione (hereinafter 1,6-spiro) and/or 1,4-dioxaspiro[4.5]decane-2-one (hereinafter 1,4-spiro) as disclosed in U.S. Pat. No. 5,853,917, the entirety of which is incorporated herein by reference, or those represented by the following chemical structures:

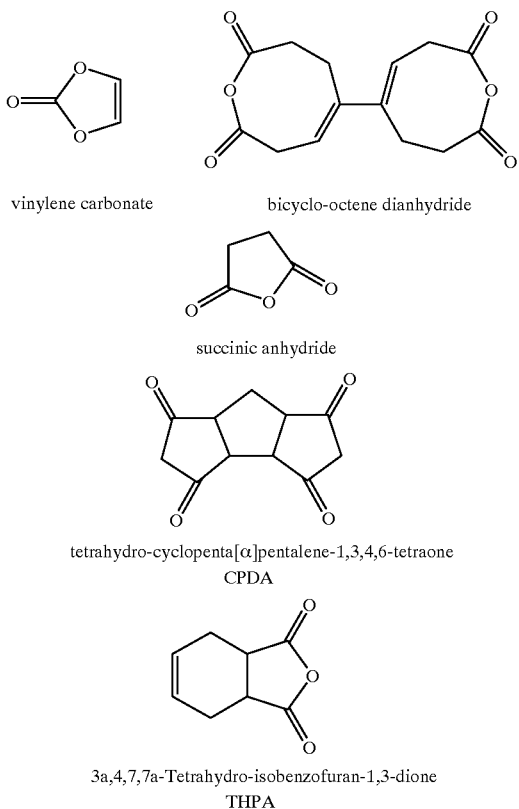

In support of the present invention, the following experiments were conducted using the following common test procedure. First electrochemical cells were fabricated wherein the working electrode comprised BF15SP graphite (believed to be from Osaka Gas, Tokyo, Japan) in a lithium polysilicate binder on a copper foil current collector. The counter electrode was lithium metal. The electrolyte was a 1M solution of LiAsF$_6$ dissolved in PC—free of any passivating additives or co-solvents. The reference electrode was lithium metal applied to a nickel strip. Each cell was conditioned using cyclic voltammetry, wherein the cells were cycled from 3 volts down to 0 volts in a stepped fashion. Parallel tests were run with analogously configured cells that were conditioned at different cycling rates, namely 0.1 mV/s and 10 mV/s. The test results are provided in FIG. No. 1.

As can be seen in FIG. 1, the cell that was cycled at 0.1 mV/s exhibited a substantially greater first cycle coulombic efficiency than the cell cycled at 10 mV/s. In addition, albeit more balanced, the second cycle coulombic efficiency for the cell cycled at 0.1 mV/s was greater than that of the cell cycled at 10 mV/s.

The foregoing description merely explains and illustrates the invention and the invention is not limited thereto except insofar as the appended claims are so limited, as those skilled in the art who have the disclosure before them will be able to make modifications without departing the scope of the invention.

What is claimed is:

1. A process for conditioning an electrochemical cell comprising the steps of:
    fabricating an electrochemical cell comprising a first electrode which comprises a carbonaceous active material and a lithium polysilicate binder, a second electrode, and an electrolyte; and
    controllably cycling the electrochemical cell, by charging and discharging the cell at a rate ranging from approximately 0.01 mV/s to approximately 1 mV/s and in turn, forming a passivation layer near an interface between the first electrode and the electrolyte.

2. The process according to claim 1, wherein the step of controllably cycling the electrochemical cell comprises the step of charging and discharging the cell at a rate of approximately 0.1 mV/s.

3. The process according to claim 1, wherein the step of controllably cycling the electrochemical cell comprises the step of applying and removing an electrical potential difference ranging from between approximately 0 volts to approximately 3 volts.

4. The process according to claim 1, further comprising the step of increasing the coulombic efficiency of the electrochemical cell relative to an electrochemical cell cycled at faster cycling rates.

5. The process according to claim 1, wherein the step of fabricating the electrochemical cell includes the step of formulating an electrolyte comprising a salt dissolved in propylene carbonate.

6. The process according to claim 1, wherein the step of fabricating the electrochemical cell includes the step of formulating a first electrode comprising graphite and lithium polysilicate binder.

7. The process according to claim 1, wherein the step of fabricating the electrochemical cell includes the step of formulating a second electrode comprising a lithium source.

* * * * *